P. Cunningham,
Wood Auger.
N° 81,607.     Patented Sep. 1, 1868.
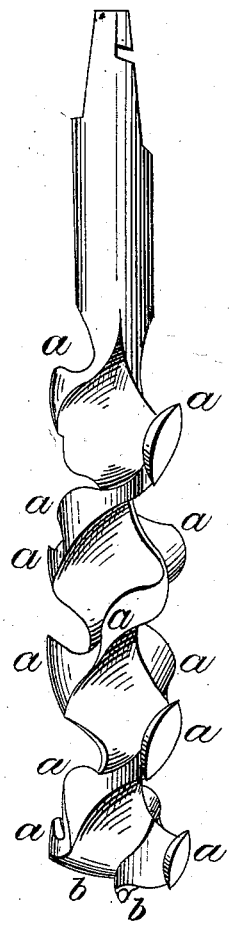
Witnesses:
Alex T. Roberts
G. C. Cotton
Inventor:
P. Cunningham
per Munn & Co
attorneys

United States Patent Office.

PETER CUNNINGHAM, OF ECKLEY, PENNSYLVANIA.

Letters Patent No. 81,607, dated September 1, 1868.

IMPROVEMENT IN SLOTTING-AUGER.

The Schedule referred to in these Letters Patent and making part of the same.

TO ALL WHOM IT MAY CONCERN:

Be it known that I, PETER CUNNINGHAM, of Eckley, in the county of Lucerne, and State of Pennsylvania, have invented a new and improved Mortising and Slotting-Auger; and I do hereby declare that the following is a full, clear, and exact description thereof, which will enable those skilled in the art to make and use the same, reference being had to the accompanying drawings, forming part of this specification, in which—

The drawing represents a perspective view of my invention.

The object of this invention is to provide an auger with which the operations of mortising and slotting may be performed rapidly.

My invention consists in forming the twist or helical part of the auger with a number of vertical rows of gouge or chisel-shaped lips, rising from the edge of the twist, and presenting sharp edges in the direction which the auger bores, so that said lips will cut the wood laterally, if the same is pushed against it after the auger has bored down vertically to a sufficient depth for the mortise or slot.

In the drawing, $a$ $a$ $a$ $a$, &c., are the lips, which may be made with a rounding or gouge-shaped edge, or a straight chisel-edge, as desired.

The wood is pushed laterally against the auger, while the same is revolving rapidly in a mortising or slotting machine, and a slot or mortise is cut thereby with ease and rapidity.

The lower lips join with the horizontal cutting-edges $b$, as shown.

If a square mortise is required, the corners must be chiselled out afterward.

This auger will cut the wood both across and against the grain, and a mortise or slot may be cut greater than the diameter of the auger.

I claim as new, and desire to secure by Letters Patent—

A mortising or slotting-auger, having rows of gouge or chisel-lips formed on the edge of the twist, substantially as described, for the purpose set forth.

The above specification of my invention signed by me, this 3d day of July, 1868.

PETER CUNNINGHAM.

Witnesses:
WILLIAM GALLAGHER,
JOHN ROACH.